Patented May 6, 1924.

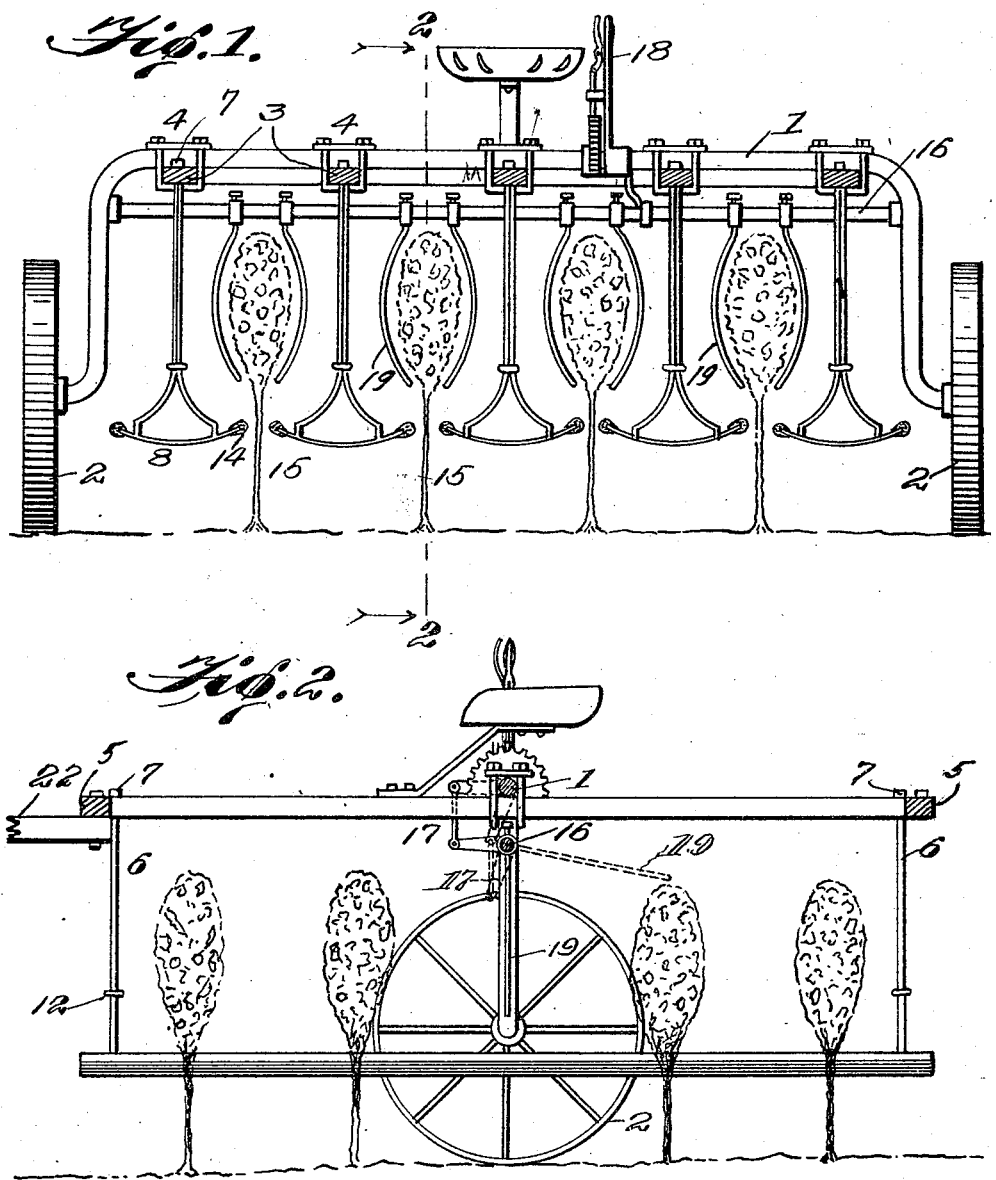

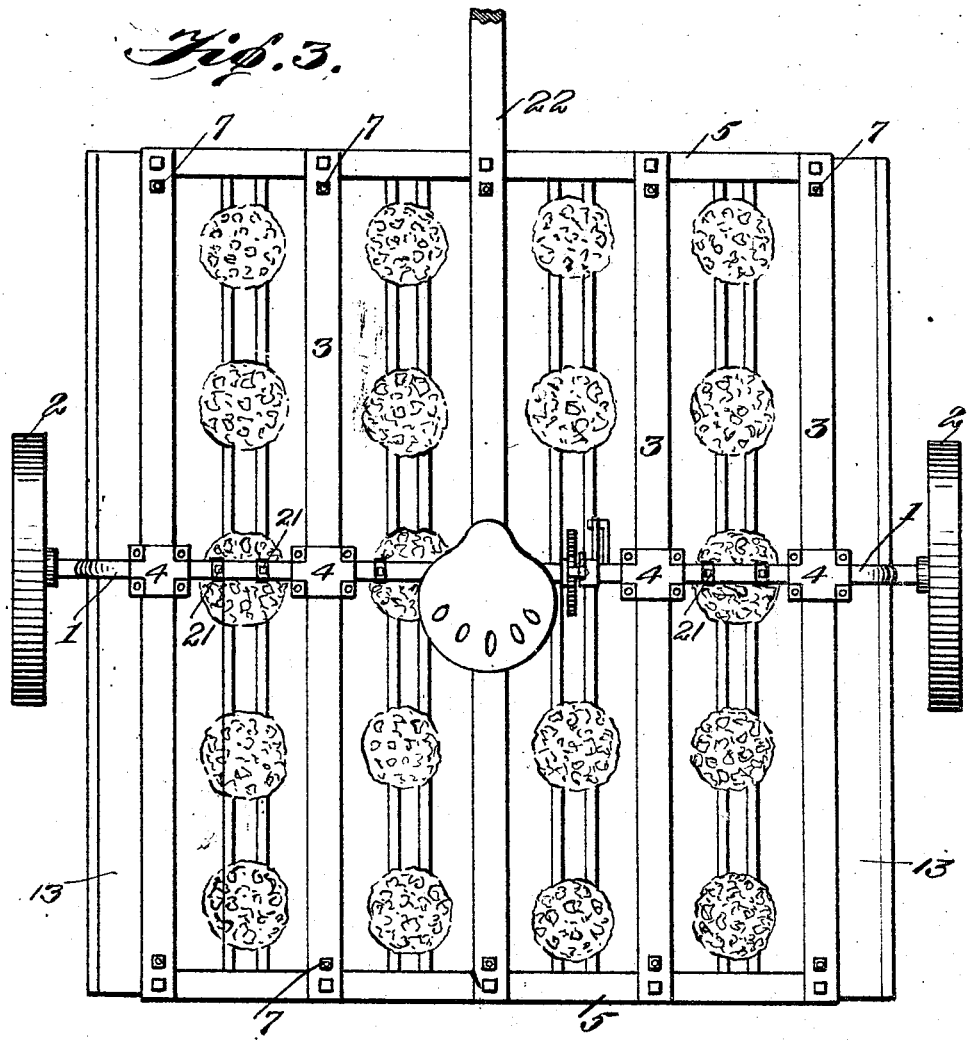

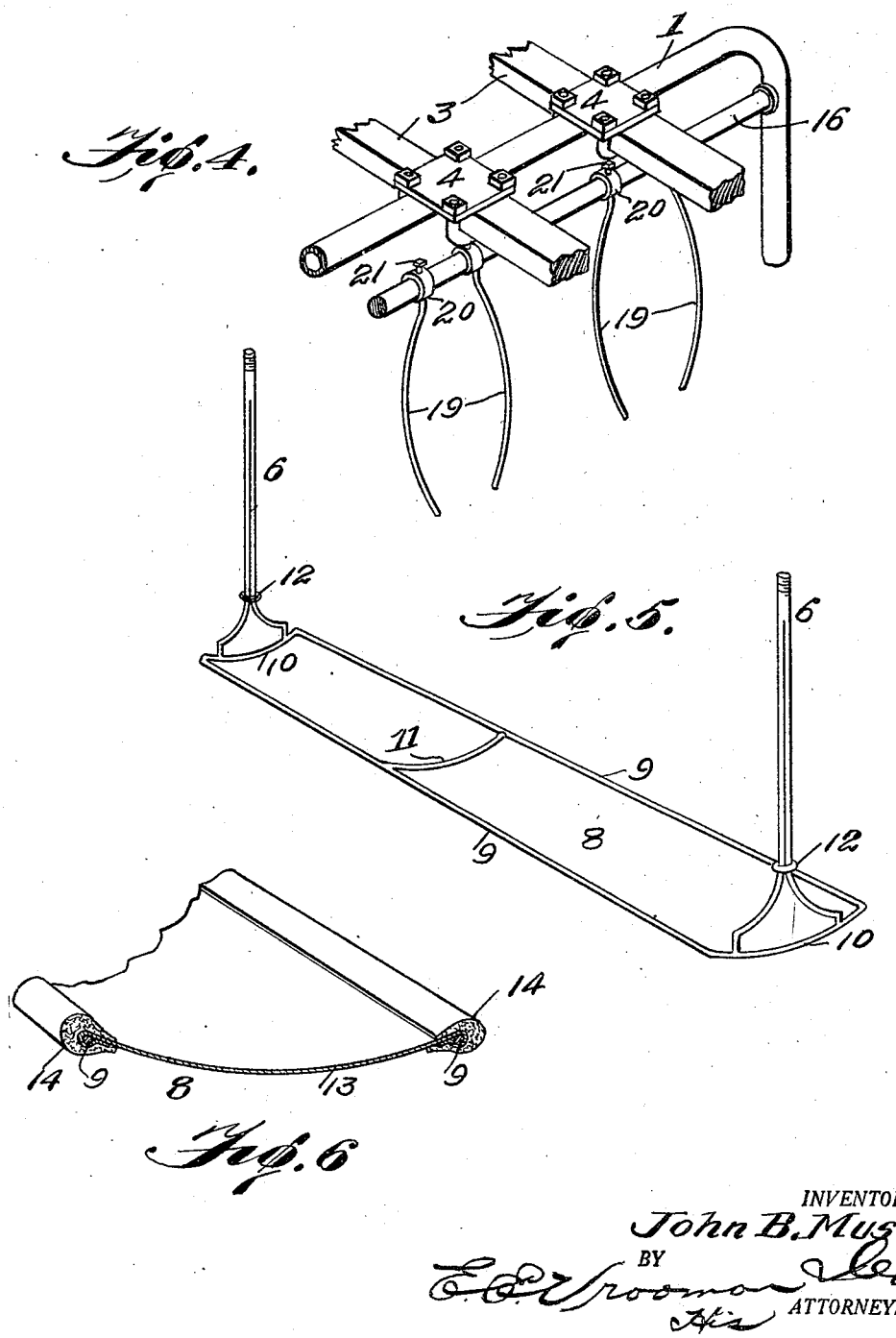

1,492,858

UNITED STATES PATENT OFFICE.

JOHN BIRT MUSE, OF CAMERON, NORTH CAROLINA, ASSIGNOR, BY DIRECT AND MESNE ASSIGNMENTS, OF ONE-THIRD TO ROBERT G. ROSSER, OF VASS, NORTH CAROLINA, AND ONE-THIRD TO ANGUS B. CAMERON, OF CARTHAGE, NORTH CAROLINA.

BOLL-WEEVIL CATCHER.

Application filed April 21, 1923. Serial No. 633,645.

*To all whom it may concern:*

Be it known that I, JOHN B. MUSE, a citizen of the United States, residing at Cameron, in the county of Moore and State of North Carolina, have invented certain new and useful Improvements in Boll-Weevil Catchers, of which the following is a specification, reference being had therein to the accompanying drawings.

This invention relates to a machine for catching cotton squares and insects (boll weevil catcher), and the object of the invention is the construction of a simple and efficient apparatus for shaking or jarring the cotton plants and the depositing of the insects upon basket devices, whereby insects can be destroyed.

Another object of the invention is the construction of an apparatus which will pass along the rows of cotton, or other plants and permit insects to be removed from the plant, or plants, and subsequently destroyed by the operator of the machine.

With the foregoing and other objects in view, my invention comprises certain novel combinations, constructions and arrangements of parts as will be hereinafter described, illustrated in the accompanying drawings, and more particularly pointed out in the appended claims.

In the drawings:

Figure 1 is a rear view, in elevation, of an apparatus constructed in accordance with the present invention.

Figure 2 is a sectional view, taken on line 2—2, Fig. 1, and looking in the direction of the arrows.

Figure 3 is a top plan view of the apparatus.

Figure 4 is a fragmentary, perspective view of the arched axle bars and fingers.

Figure 5 is a perspective view of one of the basket devices, with the canvas and padding removed therefrom.

Figure 6 is a fragmentary, perspective view of the frame showing the canvas and padding thereon.

Referring to the drawings by numerals, 1 designates an arched axle upon the ends of which are positioned wheels 2.

Horizontally positioned bars 3 are supported by clamps 4 upon the arched axle 1, and these bars 3 are connected, at their ends, by cross pieces 5. Basket devices are suspended from each bar 3 by having the suspending arms 6 extend through the bars, and nuts 7 are threaded upon the upper ends or arms 6. Each basket device comprises a rectangular frame 8 (Fig. 5), which frame includes straight sides 9 and curved, integral ends 10. A curved, central piece 11 connects the sides 9. Each arm 6 is split so that the split ends are spread apart, forming a bifurcated, lower end 6' that is fastened to the end 10. A locking collar 12 is placed around the split end of the arm to keep the end from spreading too far apart. Canvas 13 is placed upon frame 8, and over each side 9 is placed a padding 14, which padding prevents the stalk or plants 15 from being injured by reason of the basket devices hitting or rubbing against the same, as the apparatus passes along the rows.

A horizontal shaft 16 is journaled, at its ends, upon the arched axle 1, under bars 3, and this shaft 16 is connected by crank and link means 17 to operating lever 18, whereby the operator can rock the rotatable shaft 16 to cause the adjustable fingers 19 to be swung into position for striking or jarring the plants 15, or as shown in Fig. 2, the fingers can be swung out of position— see dotted line. Each finger 19 is provided with a collar 20, and by means of a set-screw 21 the fingers can be adjusted on the shaft 16, as the operator desires, for moving the fingers closer to, or further away from the plant, or plants.

The apparatus is drawn along the rows by attaching in any suitable manner draft animals to the tongue 22, and as the fingers 19 strike against the plants the insects will be knocked off the plants onto the canvas 13 of the basket devices, and then the operator can remove the insects from the basket devices and destroy the same.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In an apparatus of the class described, the combination with an axle, of a basket device carried by said axle, said basket device comprising a frame including sides and curved ends, a curved cross piece connecting said sides near their center, split suspending arms having their lower ends spread apart and connected to the ends of said frame, locking means around the split portion of said arms near their lower end, a canvas covering on said frame, padding means on the sides of said frame, and means carried by said axle for causing insects to be deposited upon the canvas of the basket device.

2. In an apparatus of the class described, the combination with a carriage, of a basket device carried by said carriage, said basket device comprising an open frame, suspending arms split longitudinally to provide sections having their lower ends spread apart and connected with the ends of said frame, clamping means slidable upon said arms to hold the split portions against movement away from each other, a fabric covering for said frame, and means carried by said carriage for causing insects to be deposited upon the fabric of the basket.

In testimony whereof I hereunto affix my signature.

JOHN BIRT MUSE.